June 5, 1956      J. ROCKOFF      2,748,399
LIGHT-WEIGHT FOAM RUBBER CUSHIONING STRUCTURE
Filed May 25, 1950      2 Sheets-Sheet 1

INVENTOR.
JOSEPH ROCKOFF
BY
ATT'Y.

June 5, 1956         J. ROCKOFF         2,748,399
LIGHT-WEIGHT FOAM RUBBER CUSHIONING STRUCTURE
Filed May 25, 1950         2 Sheets-Sheet 2

INVENTOR.
JOSEPH ROCKOFF
BY
ATT'Y.

United States Patent Office 2,748,399
Patented June 5, 1956

2,748,399

LIGHT-WEIGHT FOAM RUBBER CUSHIONING STRUCTURE

Joseph Rockoff, Dayton, Ohio, assignor to The Dayton Rubber Company, a corporation of Ohio Application May 25, 1950, Serial No. 164,080

4 Claims. (Cl. 5—348)

The present invention relates to cushioning structures comprising one or more layers of foam rubber. It relates more particularly to cushioning structures, such as mattresses, containing foam rubber and having light weight with increased thickness, controlled resiliency, economy of materials, and permitting the manufacture of structures having differential resiliency in different portions thereof.

Foam rubber cushioning structures, such as mattresses, are at present formed by molding a mass of foam rubber to the desired shape, or by assembling a plurality of layers of foam rubber to provide a structure having the desired thickness.

"Foam rubber" is the name now commonly given to a cellular product formed by foaming aqueous dispersions of rubber or rubber-like materials followed by gelling and vulcanization to provide light resilient rubber products having a multiplicity of intercommunicating cells. In mattress constructions, for example, the product is formed in large molds to a desired thickness. Generally the thickness of the foam is limited by practical considerations to about 3 in. or 4 in. which is considerably less in thickness than a conventional mattress. This requires provision of special foundations to be used with foam mattresses which are somewhat thicker than the ordinary springs which are used with cotton or inner spring mattresses. The manufacture of foam mattresses having the thickness of conventional cotton mattresses would necessitate the use of larger quantities of rubber than are absolutely necessary and would materially increase the cost of the product.

Furthermore, in the molding of foam mattresses it is generally desirable from a cost standpoint to mold these in one piece with the result that the product will have a uniform density and resilience. It is frequently desirable to construct mattresses with a differential degree of resilience or firmness coordinated to the distribution of body weight in a reclining position so that the zone or region of the mattress which supports the portion of the body which bears most heavily on the mattress is formed in a manner which will provide decreased resilience or greater load-bearing resistance.

It is an object of the present invention to provide a cushioning structure which will permit greater thicknesses to be used without necessitating the consumption of additional foam rubber material.

It is a further object of the present invention to provide a cushioning structure in which the thickness may be regulated or varied.

It is an additional object of the present invention to provide a cushioning structure in which the resiliency may be controlled and which will permit differential as well as variable resiliency to be provided in different regions of the structure at will.

In accordance with the present invention a layer of foam rubber is supported upon a hollow, resilient, inflatable air bag or similar air chamber. The chamber may be continuous or it may be divided into individual compartments each of which may be inflated to a desired degree of compression. When the chamber or air bag is so constructed that the compartments correspond with zones subjected to varying loads, these compartments may then be inflated to different degrees of pressure so that the variable load can be supported with uniform deformation of the cushioning structure.

The invention may be described in greater detail with reference to the accompanying drawings wherein.

Figure 1:
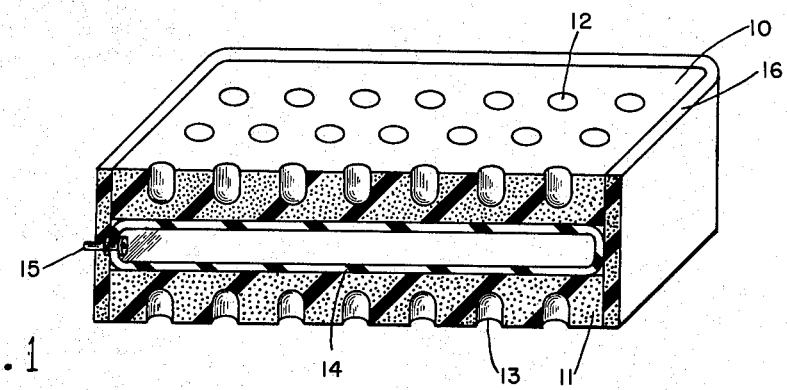
Figure 1 illustrates in cross section a view of one form of cushioning structure, such as a mattress, in which a continuous air bag is positioned between two layers of molded foam rubber.

In Figure 1 foam rubber sheets or layers 10 and 11 are formed to the desired thickness. These sheets may be molded with cores 12 and 13 if desired in order to reduce the weight of material or these cores may be omitted. Between these two layers of foam a hollow inflatable air bag 14 is positioned. This bag may be inflated by means of a valve opening 15. The air bag is preferably made of thin sheet rubber or plastic material. Preferably rubber or synthetic rubber is used where the bag is intended to be expansible or elastic. Butyl rubber is a preferred material because of its high impermeability to air which will permit us over long periods of time without requiring reinflation. In assembling the construction shown in Figure 1, for example in a mattress structure, the air bag is formed as a single continuous member having the size and shape of the final product. The bag is then partially inflated and layers 10 and 11 are cemented to the top and bottom of the bag. If desired, an edge enclosing layer 16 of foam rubber or solid rubber may be cemented around the edges of the top and bottom foam layers and the air bag. After assembly, the air bag is inflated to the desired degree of expansion.

Figure 2:
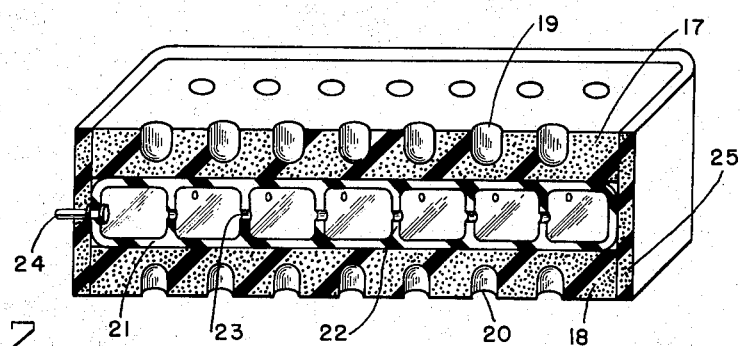
Figure 2 illustrates in cross section a view of a cushioning structure similar to that shown in Figure 1 wherein the air bag is divided into communicating cells or compartments.

In Figure 2, top and bottom layers of foam 17 and 18 formed with cores 19 and 20, are cemented to the air bag 21 positioned therebetween. This bag is formed into compartments by means of vertical partitions 22 extending either longitudinally or transversely of the bag. In order to permit inflation from a single opening or valve 24, the partitions contain openings or perforations 23 spaced along the partitions in any desired number. An edge protecting layer 25 composed of foam rubber or other elastic or resilient material may be used if desired. This form of construction will permit uniform expansion throughout the cross section of the bag due to the partitions 22. If desired the partitions may be utilized either longitudinally, transversely or in a checkerwork manner.

Figure 3:
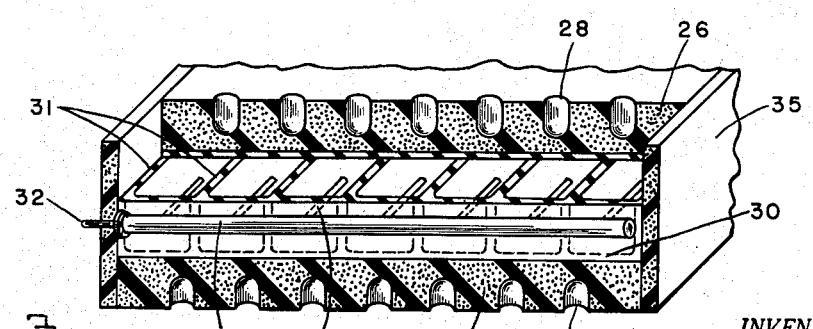
Figure 3 illustrates in cross section a cushioning structure similar to that shown in Figure 1 except that the air bag is divided into parallel, longitudinal noncommunicating cells or compartments each of which may be separately inflated.

In a modified form of the invention shown in Figure 3, top and bottom foam layers 26 and 27 containing core openings 28 and 29 are cemented to air bag 30. This bag is formed of rubber or other resilient or elastic material as referred to above and is divided into a plurality of noncommunicating compartments by means of partitions 31 which extend either longitudinally or transversely of the bag. These compartments are individually inflated from a single source through valve 32, manifold 33 and nozzles 34 which extend into the compartments. The inflating-manifold assembly is preferably positioned adjacent one end of the mattress or other cushioning member. If desired, the edge of the structure may be protected by means of member 35 formed of foam rubber or similar material.

Figure 4:
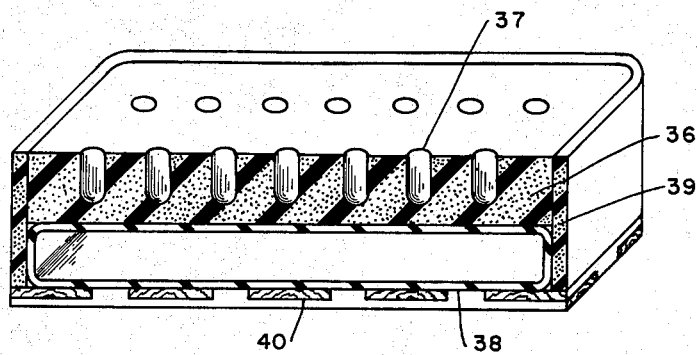
Figure 4 illustrates in cross section a modified form of the invention in which a layer of foam rubber is supported on an air bag which in turn is supported upon a framework or other supporting means.

Figure 4 illustrates a modified construction in which a single layer of foam 36 having core openings 37 is positioned upon air bag 38. The edges of the assembly are protected by means of member 39 formed of foam or other resilient material. The resulting cushioning structure, such as a mattress, may then be supported upon a lattice or slat type of foundation illustrated at 40, or upon a flat spring or the like.

Figure 5:
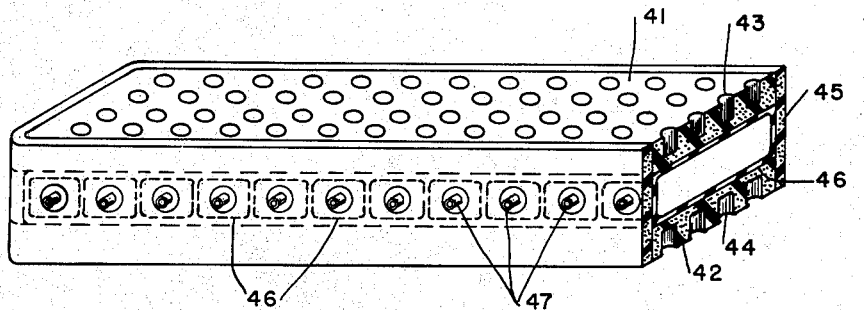
Figure 5 illustrates partly in elevation and partly in cross section a mattress construction showing a compartmented air bag positioned between layers of foam rubber in which the compartments run transversely of the mattress and may be individually inflated to provide air pressures within the structure corresponding to the differential load applied to the mattress.

In Figure 5 is illustrated an additional modification of the invention in which a mattress is shown with one end in cross section. The mattress is formed from the two layers 41 and 42 of foam rubber containing core openings 43 and 44 if desired, between which is positioned an air bag construction formed with a number of parallel transverse noncommunicating cells 46. Each of these cells may be inflated to any desired degree by means of valves 47. For example, in a mattress construction it is known that the central region of a mattress is subjected to the greatest load with lesser loads being imposed upon both ends. Research has indicated that in the general average of both men and women 34 percent of their weight is in the shoulder to girdle region, 51 percent in the pelvic to girdle region and 15 percent in the lower extremities. In accordance with the present invention therefore, this differential weight distribution can be compensated for within the mattress itself by inflating the cells in the mattress corresponding to the position which the body would occupy, to different degrees of pressure.

The pressure to which the air bag or cells thereof are inflated will depend upon the nature of the material of which the air bag is composed as well as its structure, and to the degree of expansion required of the unit. In general, pressures ranging from a fraction of a pound to a few pounds will suffice for air bags formed with a single chamber or relatively large cells, depending partly on the thickness of the material as well as its composition. In the case of an elastic material, such as rubber, a pressure should be utilized which would be less than that which would produce undue expansion or stretching of the material. In the case of non-elastic material, such as flexible plastic, higher pressures within the strength limits of the material may be used. In the case of a multicelled or honeycomb structure where the partitions act as reinforcements, somewhat higher pressures may be used if necessary to give a more rigid layer. In the structure shown in Figure 5 the cells near the head and foot of the mattress may be inflated to a relatively low pressure, whereas the intermediate cells where the greatest load occurs can be inflated to a somewhat higher pressure to provide greater rigidity in these areas.

The inflatable air bag or air cell layer as described above, may be reinforced to permit the use of higher pressures by laminating or embedding longitudinal or transverse cords or one or more layers of fabric within the rubber or other composition of which the bag is composed.

The foam rubber component of the structure described above may be made by one of the well known methods such as described in the patent to Chapman et al. No. 1,852,447 or by the patent to Talalay No. 2,432,353. The air bag may be formed of natural rubber, butyl rubber (which is an isobutylene-diolefin copolymer), or other synthetic rubbers. Flexible plastics, such as polyvinyl chloride, polyethylene, or the like, may also be utilized.

While the invention has been described in detail as applied to a mattress construction, the same principles may be applied to cushioning structures in general, such as seat cushions, upholstery cushions, and the like.

Having thus described my invention it will be understood that I desire to comprehend therein such modifications as may be necessary to adapt it to varying conditions and uses.

I claim:

1. An improved mattress construction comprising a layer of foam type cellular rubber supported upon a continuous, unitary hollow, flexible, resilient, inflatable member having a continuous planar surface contiguous and coextensive therewith, said inflatable member having a multicelled compartmented structure with the individual compartments thereof formed by vertical partitions extending transversely to the longitudinal axis of the mattress and wherein the cells in the intermediate longitudinal section of the mattress are inflated to a relatively greater pressure than the cells at the opposite ends of the mattress.

2. An improved mattress construction according to claim 1 wherein the inflatable member is in turn supported by another layer of foam type cellular rubber which is likewise in continuous contiguity therewith.

3. A mattress construction comprising a continuous, unitary hollow, flexible, resilient, inflatable supporting member said member being subdivided into a plurality of separate compartments each of which is separately inflated to a predetermined fluid pressure, and a surface layer of foamed elastomeric material positioned upon said inflatable member with its bottom surface normally contiguous and coextensive therewith.

4. A mattress construction comprising a flat foundation member, a continuous, unitary hollow, resilient, inflatable member positioned upon said foundation and substantially coextensive therewith, and a layer of foamed elastomeric material positioned upon said inflatable member, said inflatable member consisting of a plurality of parallel compartments each of which is separately inflated to a desired fluid pressure whereby the corresponding surface areas of said mattress possess differing degrees of rigidity.

References Cited in the file of this patent

UNITED STATES PATENTS

| Number | Name | Date |
|---|---|---|
| 184,487 | White | Nov. 21, 1876 |
| 274,495 | Heath | Mar. 27, 1883 |
| 289,122 | Miller | Nov. 27, 1883 |
| 595,734 | Rand et al. | Dec. 21, 1897 |
| 754,329 | Milliken | Mar. 8, 1904 |
| 1,446,290 | Dessau | Feb. 20, 1923 |
| 1,970,803 | Johnson | Aug. 21, 1934 |
| 2,039,289 | Bergeron | May 5, 1936 |
| 2,253,801 | Neal | Aug. 26, 1941 |
| 2,314,608 | Cunningham et al. | Mar. 23, 1943 |
| 2,627,077 | Forsyth | Feb. 3, 1953 |
| 2,627,302 | Forsyth | Feb. 3, 1953 |
| 2,672,183 | Forsyth | Mar. 16, 1954 |